United States Patent [19]

Stenger

[11] Patent Number: 5,258,303
[45] Date of Patent: Nov. 2, 1993

[54] BIOREMEDIATION SYSTEM AND METHOD

[76] Inventor: Raymond C. Stenger, 279 Plymouth Dr., Freehold, N.J. 07728

[21] Appl. No.: 743,907

[22] Filed: Aug. 12, 1991

[51] Int. Cl.$^5$ .............................................. C12M 1/00
[52] U.S. Cl. .................................... 435/262; 435/299; 435/311; 435/313; 435/315
[58] Field of Search ............... 435/262, 311, 299, 313, 435/315; 422/184; 210/170, 603, 747

[56] References Cited

U.S. PATENT DOCUMENTS

| | | | |
|---|---|---|---|
| 3,586,624 | 6/1971 | Larson | 210/747 |
| 4,073,686 | 2/1978 | Adams | 195/2 |
| 4,401,569 | 8/1983 | Jhaveri et al. | 210/610 |
| 4,435,292 | 3/1984 | Kirk et al. | 210/747 |
| 4,624,604 | 11/1986 | Wagner et al. | 405/128 |
| 4,678,582 | 7/1987 | Lavigne | 210/150 |
| 4,760,027 | 7/1988 | Sublette | 435/266 |
| 4,765,902 | 8/1988 | Ely et al. | 210/610 |
| 4,803,166 | 2/1989 | Kulpa et al. | 435/253.3 |
| 4,849,360 | 7/1989 | Norris et al. | 435/264 |
| 4,850,745 | 7/1989 | Hater et al. | 405/258 |
| 4,908,129 | 3/1990 | Finsterwalder et al. | 210/170 |
| 4,962,034 | 10/1990 | Khan | 435/262 |
| 4,992,174 | 2/1991 | Caplan et al. | 210/610 |
| 5,067,852 | 11/1991 | Plunkett | 405/128 |
| 5,080,782 | 1/1992 | Caplan et al. | 210/151 |

*Primary Examiner*—Robert J. Warden
*Assistant Examiner*—Krisanne M. Thornton
*Attorney, Agent, or Firm*—Thomas A. Lennox

[57] ABSTRACT

An apparatus and method to clean chlorinated hydrocarbon contaminated soils with a bioremediation system is provided. Treatment beds about one-half acre in size are provided with a gravel base on an impervious film layer. A woven polyethylene membrane is laid on the gravel base with a sand layer in between the membrane and the soil layer to be treated. An aqueous treating liquid containing selective microorganisms is sprinkled on the top surface of the soil layer. Exit gases from the bioreactor are released at zero pressure through perforated pipes laid in the base aggregate layer.

8 Claims, 3 Drawing Sheets

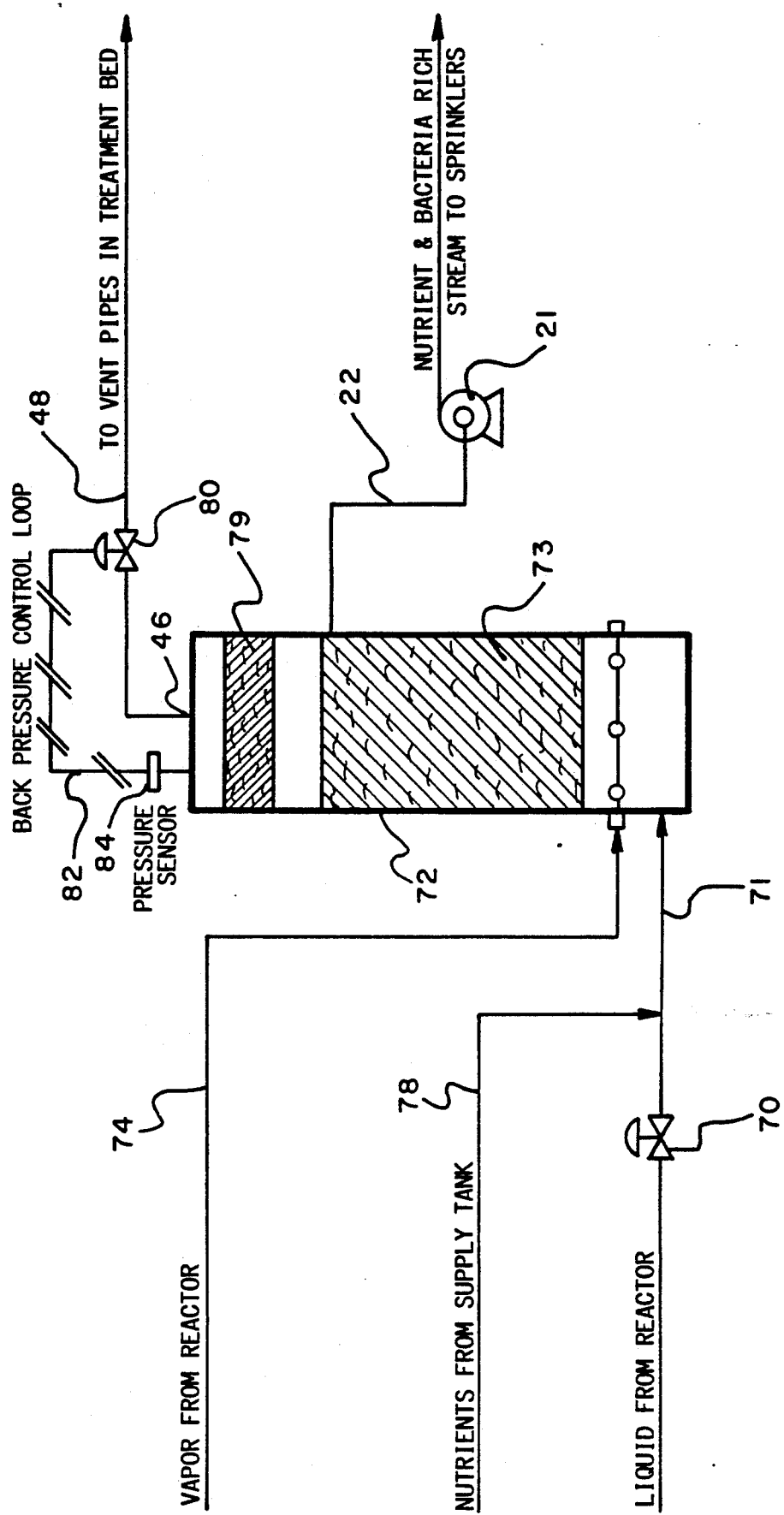

BIOREMEDIATION SYSTEM AND METHOD

BACKGROUND OF THE INVENTION

This invention involves an apparatus to clean a carrier, such as soil, contaminated with biodegradable chemical compounds, such as halogenated organic chemicals.

One of the most vexing problems associated with hazardous waste sites is the difficulty in the cleaning of the soils which has been subjected to a spill or even long term usage involving chlorinated hydrocarbons. The hazardous nature of chlorinated hydrocarbons and hydrocarbon derivatives is well documented. The chlorinated hydrocarbons extensively used in dry cleaning establishments and as minor but persistent components in petroleum products continue to cause great problems. While the chlorinated aliphatic hydrocarbon poses difficulty, the chlorinated aromatic hydrocarbons and in particular the fully halogenated hydrocarbon derivatives pose even greater problems.

Bioremediation using microorganisms has offered the most effective method of cleaning up hazardous waste sites. The use of microorganisms which are designed to break down certain chemical compounds and more importantly to selectively secrete enzymes to break down the more completely chlorinated hydrocarbons is well documented. These compounds, referred to herein as biodegradable chemical compounds, include not only partially halogenated but also fully halogenated carbon based compounds. These compounds are classified as "BOD" (biological oxidizable demand) which require additional oxygen during bioremediation with the treatment being enhanced by micronutrients, trace metals, organic acids, alcohols and other compounds. The more difficult compounds, such as PCB's, are classified "COD" (chemical oxidizable demand) requiring prior chemical reaction before digestion is effective by the microorganisms.

In addition to waste spills contaminating the ground, there is the need for bioremediation of a waste product stream from a chemical plant. In order to avoid having to pay a waste treatment company to break down these hazardous chemicals, there is a need for a small waste treatment unit which can be housed at the site where the waste stream of hazardous chemicals is created. This in-house bioremediation waste treatment unit need not involve the use of soil as a carrier, but may utilize any suitable carrier including clean sand or the like.

One of the problems associated with bioremediation techniques is that the vapor by-product of the completed reaction is carbon dioxide which is ultimately vented to the atmosphere. In order to avoid small quantities of organic compounds being vaporized and entrained with the issuing gases, special filters, such as activated carbon, scrubbers, and like equipment have been required to make sure that the atmosphere is not polluted as a result of the waste disposal reaction. The use of filters and scrubbers severely increase the cost and reduce the efficiency of the system and are generally directed to extremely small quantities of the noxious or possibly toxic vapors.

A number of bioremediation systems have been provided particularly including U.S. Pat. No. 4,992,174 to Jason A. Caplan et al, U.S. Pat. No. 4,850,745 to gary R. Hater et al, U.S. Pat. No. 4,401,569 to Vidyut Jhaveri et al, U.S. Pat. No. 4,849,360 to Robert D. Norris et al, U.S. Pat. No. 4,765,902 to Douglas L. Ely et al, and U.S. Pat. No. 4,945,988 to Frederick C. Payne et al, all incorporated herein by reference to describe the standard bioremediation organisms, techniques, and apparatus.

None of these systems and methods satisfy the problem of gases issuing from the bioremediation system nor attain the objects described hereinbelow.

SUMMARY OF THE INVENTION

This invention is directed to bioremediation of biodegradable chemical compounds. The device and method is directed to the common chlorinated hydrocarbons and with modifications to the completely chlorinated compounds, such as carbon tetrachloride and halogenated aromatic compounds which are sometimes referred to as biodegradable carbon based chemical compounds, both of the BOD and COD designations.

This invention also involves and contemplates its use not only at a site where contaminated soil is brought to be cleaned, but also in a waste treatment unit where a carrier is purposefully "contaminated" with the chemical to be ingested by the microorganisms. Thus, while the specific embodiment described treats many acres of soil, a smaller facility located directly on the grounds where small quantities of chlorinated by-products are produced is also contemplated. In this latter instance, the small quantity of chlorinated hydrocarbons may be subjected to bioremediation using the device and system of the present invention at the site where the contaminants are produced. In this configuration, the carrier is purposefully contaminated and spread on a small version of the treatment cells described hereinbelow. Further, since the bioreactor means used in the present invention can be portable, a chemical company can move this bioreactor means from plant site to plant site to treat accumulated hazardous chemicals.

This invention is intended to be used with a variety of strains of bacteria specially designed or chosen for bioremediation techniques described and listed in the patents incorporated by reference hereinabove as well as U.S. Pat. Nos. 3,846,290; 4,385,121; and 4,765,902, also incorporated by reference herein. The strains of bacteria for any particular waste compounds are well known and all may be used in the present invention including the ones listed in the references listed above.

The system and methods of this invention also include a bioreactor also described fully in the prior art. The bioreactor is a vessel packed with materials to extend the surface area on which the microorganisms can grow such as column packing materials including burrel saddles, corrugated plastic trays, and the like. The bioreactor is intended to produce huge bacteria counts which slough off into the aqueous medium to be transported to the site of the bioremediation. The bioreactor also approaches infinite contact of the aqueous medium with the bacteria cultures to complete bioremediation of the input liquid and gases.

It is an object of the invention to couple the bioreactor with a column to exert back pressure on the bioreactor to achieve high oxygen solvency in the water to promote propagation of the microorganisms.

It is a particular object of the present invention to provide biotreatment of vapors issuing from the bioreactor, thus avoiding the necessity of special filtration and scrubbing devices to eliminate the generally minute quantities of organic compounds issuing from the vent.

It is a further object of this invention to provide a practical treatment bed system where contaminated soils may be brought to a site, spread on the treatment beds, cleaned and returned for general safe usage.

It is an additional object of the present invention to provide a bioremediation system which can clean contaminated soils which vary in contamination from minute quantities of highly toxic chemicals, to relatively large concentrations of contaminates, generally a mixture with less toxic variants of halogenated hydrocarbons.

It is an additional object of the present invention to provide bioremediation systems which can handle large quantities of contaminated soil treated to a couple of feet deep spread over areas up to many acres in size.

An aspect of the invention is an apparatus to clean a carrier contaminated with biodegradable chemical compounds, wherein the carrier contaminated with biodegradable chemical compounds is disposed with an exposed surface on top of a layered bed. The layered bed includes impervious retaining means at the bottom of the bed to prevent any liquid from escaping from the bed, and a base layer disposed on the impervious retaining means includes aggregate. The apparatus includes bioreactor means to hold and propagate a supply of microorganism means includes microorganisms to break down and digest the biodegradable chemical compound contaminants and to bring these microorganism means into intimate contact with liquid and gaseous biodegradable chemical compound contaminants. The bioreactor means further includes a vapor vent to issue vapors and a liquid outlet means to issue a treating liquid includes microorganisms. The apparatus further includes a multiplicity of parallel aligned first perforated tubing laid in the base layer, and pump means to draw a vacuum on the first perforated tubing and transport fluid from the base layer to the bioreactor means. The apparatus also includes a multiplicity of parallel second perforated tubing laid in the base layer, and first feed line means fluid flow connect the second perforated tubing with the vapor vent. The apparatus further includes sprinkling means to spread the treating liquid over the exposed surface of the carrier, and second feed line means fluid flow connecting the liquid outlet means with the sprinkling means.

It is preferred that the second length of perforated tubing be of sufficient length and of sufficient porosity to reduce the pressure of the vent vapors to zero. It is further preferred that the layered bed further include membrane means disposed on the base means to prevent fine particle size material from entering the base layer, and separation layer means disposed on the membrane means to provide a porous layer, to aid in liquid dispersion between the layers, and to separate the carrier contaminated with biodegradable chemical compounds from the membrane means. It is also preferred that the bioreactor means include mixing means to prepare an aqueous mixture of microorganisms and to feed the mixture to bioreactor column means to propagate the microorganisms and to bring the microorganisms into intimate contact with the fluid from the base layer, and distribution means to receive fluid from the bioreactor column means, provide controllable back pressure to the bioreactor column means, and to distribute vapors to the first feed line means and liquid to the second feed line means. It is further preferred that the first length of perforated tubing be of sufficient porosity and that the vacuum drawn on that tubing be sufficient to draw air into the tubing along with the treating liquid.

Another aspect of the invention is an apparatus to clean a carrier contaminated with biodegradable chemical compounds, wherein the carrier contaminated with biodegradable chemical compounds is disposed with an exposed surface on top of a layered bed that includes impervious retaining means at the bottom of the bed to prevent any liquid from escaping from the bed, and a base layer disposed on the impervious retaining means includes aggregate. The apparatus includes bioreactor means to hold and propagate a supply of microorganism means includes microorganisms to break down and digest the biodegradable chemical compound contaminants and to bring these microorganism means into intimate contact with liquid and gaseous biodegradable chemical compound contaminants, the bioreactor means includes a vapor vent to issue vapors and a liquid outlet means to issue a treating liquid that includes microorganisms. The apparatus further includes a multiplicity of parallel aligned first perforated tubing laid in the base layer, and pump means to draw a vacuum on the first perforated tubing and transport fluid from the base layer to the bioreactor means. The apparatus also includes third feed line means fluid flow connecting the first perforated tubing to pump means to the bioreactor means, and first feed line means fluid flow connecting the vapor vent with second perforated tubing laid parallel with the first perforated tubing in the base layer. The apparatus further includes second feed line means fluid flow connecting the liquid outlet means with a sprinkling means to spread the treating liquid over the exposed surface of the carrier.

Yet another aspect of the invention is a system to clean soil contaminated with biodegradable chemical compounds, wherein the soil contaminated with biodegradable chemical compounds is disposed with an exposed surface on top of a layered bed. The system includes a layered bed that includes impervious retaining means at the bottom of the bed to prevent any liquid from escaping from the bed, a base layer disposed on the impervious retaining means includes stone granules, membrane means disposed on the base means to prevent fine particle size material from entering the base layer, and separation layer means disposed on the membrane means to provide a porous layer, to aid in liquid dispersion between the layers, and to separate the carrier contaminated with biodegradable chemical compounds from the membrane means. The system further includes bioreactor means to hold and propagate a supply of microorganism means includes microorganisms to break down and digest the biodegradable chemical compound contaminants and to bring these microorganism means into intimate contact with liquid and gaseous biodegradable chemical compound contaminants. The bioreactor means further includes a vapor vent to issue vapors and a liquid outlet means to issue a treating liquid includes microorganisms. The system also includes a multiplicity of parallel aligned first perforated tubing laid in the base layer, and pump means to draw a vacuum on the first perforated tubing and transport fluid from the base layer to the bioreactor means. The system further includes first feed line means fluid flow connecting the first perforated tubing to pump means to the bioreactor means, second feed line means fluid flow connecting the vapor vent with second perforated tubing laid parallel with the first perforated tubing in the base layer, and third feed line means fluid flow connecting the liquid outlet means with a sprinkling means to spread the treating liquid over the exposed surface of the soil. It is preferred that the system include the second length of perforated tubing being of sufficient length and of sufficient porosity to reduce the pressure of the vent vapors to zero.

Yet another aspect of the invention is a method to clean a carrier contaminated with biodegradable chemical compounds that includes preparing a bed that includes laying an impervious retaining means at the bottom of the bed to prevent any liquid from escaping from the bed, laying a base layer disposed on the impervious retaining means includes coarse aggregate, laying membrane means disposed on the base means to prevent fine particle size material from entering the base layer, and laying separation layer means disposed on the membrane means to provide a porous layer, to aid in liquid dispersion between the layers, and to separate the carrier contaminated with biodegradable chemical compounds from the membrane means. The method further includes spreading the carrier contaminated with at least one biodegradable chemical compound with an exposed surface on top of the layered bed. The method also includes holding, propagating, and supplying microorganism means including microorganisms in a vessel to break down and digest the biodegradable chemical compound contaminants, and bringing these microorganism means into intimate contact with liquid and gaseous biodegradable chemical compound contaminants. The method further includes issuing a treating liquid includes microorganisms, and sprinkling the treatment liquid over the exposed surface of the carrier. The method also includes drawing a vacuum on a multiplicity of parallel aligned first perforated tubing laid in the base layer, and transporting fluid from the base layer to the vessel. The method further includes venting vapors from the vessel, and allowing the vented vapors to flow out to second perforated tubing laid parallel with the first perforated tubing in the base layer.

Another aspect of the invention is a method to clean a carrier contaminated with biodegradable chemical compounds, wherein the carrier contaminated with biodegradable chemical compounds is disposed with an exposed surface on top of a layers bed that includes impervious retaining means at the bottom of the bed to prevent any liquid from escaping from the bed, a base layer disposed on the impervious retaining means includes aggregate, membrane means disposed on the base means to prevent fine particle size material from entering the base layer, and separation layer means disposed on the membrane means to provide a porous layer, to aid in liquid dispersion between the layers, and to separate the carrier contaminated with biodegradable chemical compounds from the membrane means. The method includes providing bioreactor means to hold and propagate a supply of microorganism means including microorganisms to break down and digest the biodegradable chemical compound contaminants and to bring these microorganism means into intimate contact with liquid and gaseous biodegradable chemical compounds contaminants, the bioreactor means includes a vapor vent to issue vapors and a liquid outlet means to issue a treating liquid including microorganisms. The method further includes laying a multiplicity of parallel aligned first perforated tubing laid in the base layer, and connecting pump means to draw a vacuum on the first perforated tubing and transport fluid from the base layer to the bioreactor means. The method also includes connecting first feed line means fluid flow connecting the first perforated tubing to pump means to the bioreactor means, and connecting second feed line means fluid flow connecting the vapor vent with second perforated tubing laid parallel with the first perforated tubing in the base layer. The method further includes connecting third feed line means fluid flow connecting the liquid outlet means with a sprinkling means to spread the treating liquid over the exposed surface of the carrier.

BRIEF DESCRIPTION OF THE DRAWINGS

FIG. 4 is a diagram of a back pressure and distribution column of the present invention.

DESCRIPTION OF PREFERRED EMBODIMENTS

Figure 1:
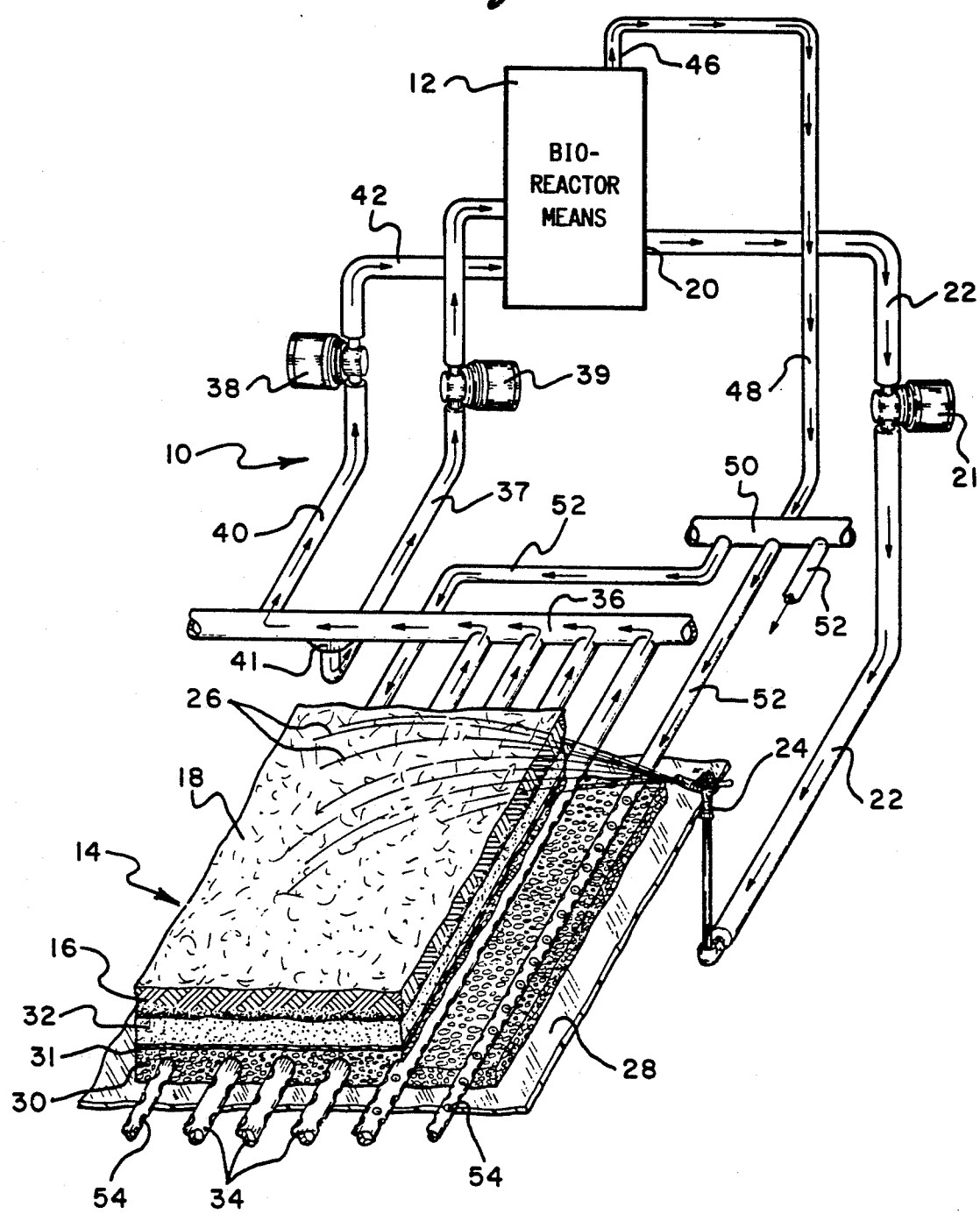
FIG. 1 is a perspective view partially cut away showing a working section of a bioremediation system of the present invention.

In FIG. 1, an apparatus of the present invention to clean soil contaminated with biodegradable chemical compounds is illustrated. This cutaway drawing illustrates a section of a field, which is duplicated a multiplicity of times across the field and to adjacent fields. At the heart of the apparatus is bioreactor means 12 illustrated in FIG. 2. Contaminated soil 16 is spread about six inches to three feet deep on the top of treatment bed 14 with top surface 18 exposed. It is preferred to treat soil at a depth of about six inches to one foot. As the depth is decreased below six inches or increased above twenty-four inches, increased pocketing and channeling results. Treated liquid composed of a water slurry of selected strains of bacteria cultures chosen to degrade the chemical compounds contaminating soil layer 16 issue from liquid outlet 20, pumped by pump 21 through tubing 22 to sprinkler head 24 which sprinkles treating liquid 26 on top surface 18. Multiple sprinkler heads 24 are utilized to continuously sprinkle the treating liquid on top surface 18. Although only one sprinkler head 24 is shown, multiple sprinkler heads are positioned to maintain continuous distribution and full coverage of liquid on top surface 18 of treatment bed system 14. Treatment bed system 14 is constructed on impervious plasticized polyvinyl chloride film layer 28 that is sealed together to form a barrier so that liquid cannot reach the ground outside the treatment bed. The lowest layer 30 of the treatment bed is about a foot deep layer of graded stone aggregate, preferably a selection of graded stone which provides substantially free percolation and compacts to a solid essentially non-compressible state. It may comprise pea gravel or course sand. The base layer is constructed of aggregate using techniques well known in the drainage field to protect buried drainage pipe and like pipes from damage due to heavy equipment passing over them while providing a relatively free flow of liquid downwardly to the pipe where the liquid is transported away. In normal drainage fields, the liquid is dissipated through openings in the pipe to an aggregate which then allows the liquid to flow to the subsurface and the surrounding soil. The aggregate protects the pipes from damage in this application. Granular aggregate of a size larger than sand is preferred for best protection. Geomembrane 31 is placed on top of the aggregate layer 30 to prevent smaller particle size materials from dropping downwardly and clogging the pores of the aggregate layer. Typical geomembrane layers are woven fabric of polyethylene, polypropylene or fine nylon screen. On top of membrane 32 is spread six to twelve inch layer 32 of sand. Contaminated soil 16 is spread directly on the sand. The sand allows separation between the soil and membrane 31, aids in distribution of the liquid flowing downwardly and provides a guide when the treated clean soil is removed to avoid the equipment from disrupting the membrane or base aggregate layer 30. A multiplicity of two inch diameter schedule eighty PVC pipes 34 are buried in base layer 30 of the treatment bed. Pipes 34 have one-quarter inch holes on one inch centers which have been drilled to provide substantial perforations the entire length of pipes 34 that are in the treatment bed. Perforated pipes 34 are placed in parallel alignment about five feet apart connected to header pipe 36. Valves are provided to close at least every other pipe 34 to allow reducing the vacuum concentration to compensate for varying soil densities and depths. Vacuum pump 38 draws a 4 to 10 inch Hg vacuum on feed line pipe 40 which is fluid flow connected to header 36 to draw the vacuum on perforated pipes 34. The one-quarter inch holes, on all sides of the pipes, pull sufficient vacuum not only to draw liquid 26 downwardly through soil layer 16, sand layer 32 and base aggregate level 30, but also to draw substantial quantities of air downwardly to the system. Vacuum pump 38 draws all vapors and some liquid and delivers it through pipe 42 to bioreactor means 12. Although not shown, a demister apparatus would generally be installed in line 40 prior to vacuum pump 38 to reduce and collect excessive liquid delivering it to a sump or in this case directly to line 37 to be pumped in the liquid stream to bioreactor means 12. Pump 39 transports liquid to bioreactor means 12 from the field along line 37 from sump 41 collecting the liquid drawn down through field 14. The liquid from the treatment beds contains solubilized contaminants and bacteria in an aqueous solution. The vapors, being mostly carbon dioxide and air are allowed to bubble through bioreactor 66 of the bioreactor means 12 diagramed in FIG. 2, to scrub out organic impurities and cause them to react with the microorganisms to produce carbon dioxide and water. Although pipes 34 are about four to five feet apart for most soil conditions and depths of soil, it is generally sufficient to use every other pipe so that the effective vacuum is being drawn in pipes about eight to ten feet apart. As the depth of the soil is increased, the amount of short circuiting such that the vacuum pulls the liquid downwardly along regular paths reducing the efficiency of the treatment. Thus, the spacing between the vacuum tubes requires a lesser number of tubes be used. Further, if the depth of the treated soil is relatively shallow, short circuiting is common, but since the length of the flow path through the soil is short, it is necessary to use closer spacing between the active vacuum tubes. Thus, as the depth of the treated soil is increased toward about three feet or decreased toward about six inches, adjustment of the spacing of the vacuum tubes is necessary. A major product of the biological reaction is carbon dioxide and although a significant amount of carbon dioxide escapes from bed 14, a substantial amount of that gas together with air and other small quantities of organic compounds are pumped through pipe 40 into bioreactor means 12. After the inlet gases are brought into close intimate contact with the microorganisms in bioreactor means 12, almost all of the exit gases are carbon dioxide and air, possibly with some organic contaminants leaving through exit port 46. These gases are under pressure and travel along pipe 48 to header 50 from which a multiplicity of one inch diameter PVC pipes 52 are connected aligned parallel with pipes 34 in base aggregate bed 30. Sections 54 of pipes 52 are perforated with one-eighth inch holes, on one inch centers within treatment bed 14 spaced about five feet from the closest vacuum tube 34. The length, number and porosity of pipes 54 are sufficient to reduce the pressure of exit gases to zero where they flow outwardly and upwardly through bed 14 coming into intimate contact with treating liquids 16 filtering downwardly ultimately to reach vacuum tubes 34 and be drawn back into the system. This contact with treating liquid 26 reduces and digests any remaining organic impurities before the carbon dioxide and air reach surface 18. Although all perforated pipes in bed 14 are shown parallel to each other and parallel to the other types of pipes, an exact parallel configuration is not required so long as the entire bed is satisfactorily treated. For example, vent gas pipes 54 need not be parallel to pipes 34 and may be placed in a crisscrossing arrangement. This is not preferred as it tends to bring the vent gas lines in close proximity to the vacuum lines at the cross over points. However, increasing of the depth of the base layer or judicious perforations can allow such a configuration. The relative number of vent gas pipes 54 to vacuum pipes 34 is a relatively simple fluid flow calculation. As shown in FIG. 1, there is one tube 54 for each two tubes 34. That ratio will vary depending upon the flow constraints within the system.

In studying construction of the treatment beds, it will be clear that the structure may be modified substantially without departing from the spirit of the invention. For example, the impervious layer need not be flat and may have sloped sides to cause liquid to collect in the depression. This has the advantage that a submerged liquid intake opening may be provided drawing liquid only from the bed and delivering it to the bioreactor means. This tends to reduce the amount of liquid drawn by the vacuum lines. A separate pump is provided to draw the liquid only to the bioreactor means while continuing to provide the vacuum lines which draw liquid and gaseous products from the bed to the bioreactor means.

Figure 2:
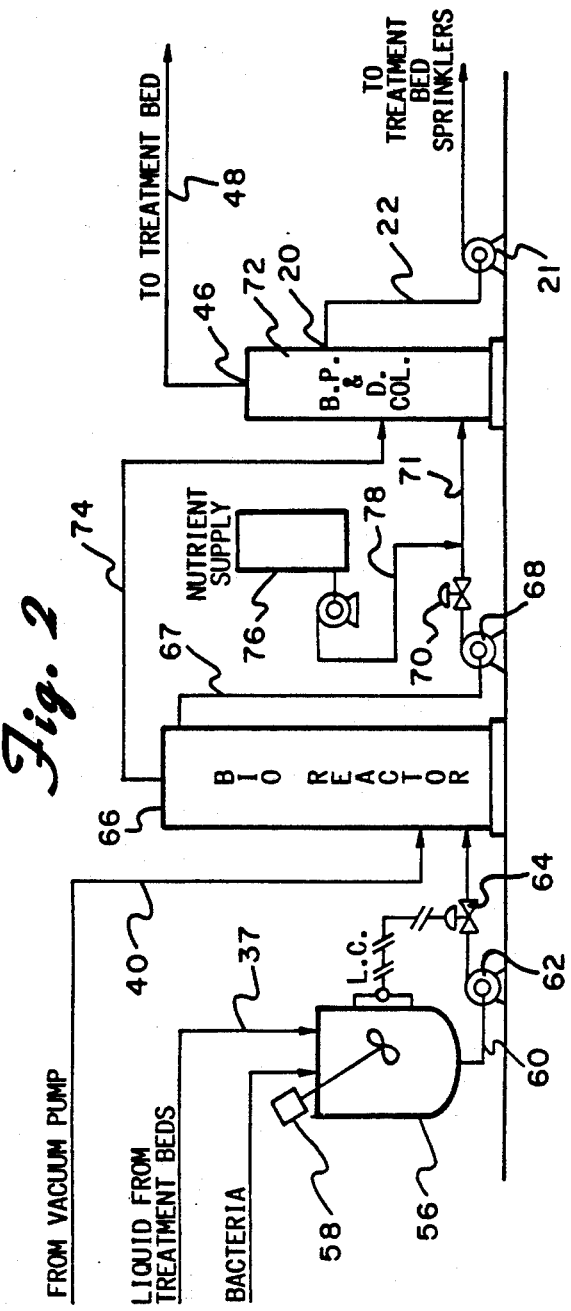
FIG. 2 is a diagram illustrating a bioreactor means used in the system illustrated in FIG. 1.

Bioreactor means 12 as illustrated in FIG. 2 includes mixing tank 56 agitated by electric stirrer 58 receiving liquid through pipe line 37 from the treatment beds together with charges of selective bacteria chosen for the particular chemicals in the contaminated soil. The aqueous slurry of bacteria is drawn from tank 56 through pipe 60 by pump 62 through control valve 64 to bioreactor 66. Standard level controller, shown as "L.C.", maintains the level of liquid in tank 56. Also feeding bioreactor 66 is feed line 40 charging all gases expelled from vacuum pump 38. The interior of bioreactor 66 is a multiplicity of trays constructed of extruded corrugated plastic sheet operated in a flooded condition providing essentially infinite contact of the liquid with the bacteria growing on the extended interior surfaces of the bioreactor such that the colonies continue to propagate and the bacteria are sloughed off and carried by the liquid through pipe 67 drawn by pump 68 through pipe line 71 and control valve 70 to feed back pressure and distribution column 72. Nutrient supply 76 provides enhancements through line 78 since the treatment liquid in line 70 tends to be low in nutrients at this stage as bioreactor 66 processing has essentially digested all of the organic material in the bioreactor. Basic nutrients such as sugar are generally avoided with these specialized bacteria, although small quantities of alcohol provide continuous nutrition as well as a supply of oxygen in the treating liquid. In addition, micronutrients, such as trace metals, like vanadium, and folic acid, enhance performance of certain bacteria. Column 72 as diagramed in FIG. 4 provides back pressure to bioreactor 66 to increase the solubility of oxygen in the liquid and allow even continuous distribution of treating liquid through exit port 20 through pipe line 22 by pump 21 to treatment bed sprinklers 24. Gaseous products from bioreactor 66 are allowed to pass under pressure through pipe 74 through the liquid flooding packing 73 in column 72 where pressure is maintained. Standard state of the art demister unit 79 is positioned inside near the top of unit 72 to take liquid out of the vapor stream. Unit 79 is a fine wire mesh or a packing of small cones to accumulate mist on the surface and allow it to drop back into the bulk liquid. The vapors escape through exit port 46 to flow through pipes 48 to perforated pipes 52 until they attain zero pressure in the treatment bed. Control valve 80 is actuated and controlled by back pressure loop air line 82 which measures vapor pressure in unit 72 with sensor 84. Valve 80 is modulated to a set pressure point to control vapor pressure in bioreactor 66 and vapor dissipation to the bed. Typical bioreactors 66 are supplied to the industry by Biotech Industries, Inc. 170 Lawlins Park, Wychoff, N.J. 07481 further described in their U.S. Pat. No. 4,921,604 patent, incorporated herein by reference. As noted above, selective bacteria that are effective on particular chlorinated hydrocarbons are well known in the art and are selected to secrete enzymes to break down the chlorinated hydrocarbons so that the final reaction to carbon dioxide and water may be achieved. It is feasible to provide the entire bioreactor means as illustrated in FIG. 2 in a semi-portable condition. For example, the unit comprising the bioreactor means can be transported and maintained on flatbed trailers, being brought from site to site as the cells are ready for treatment. Since transportation of the bioreactor means is easier then transporting the soil great distances, it is economically feasible to move the bioreactor means from treatment site to treatment site rather than to truck the contaminated soil to a single site.

Figure 3:
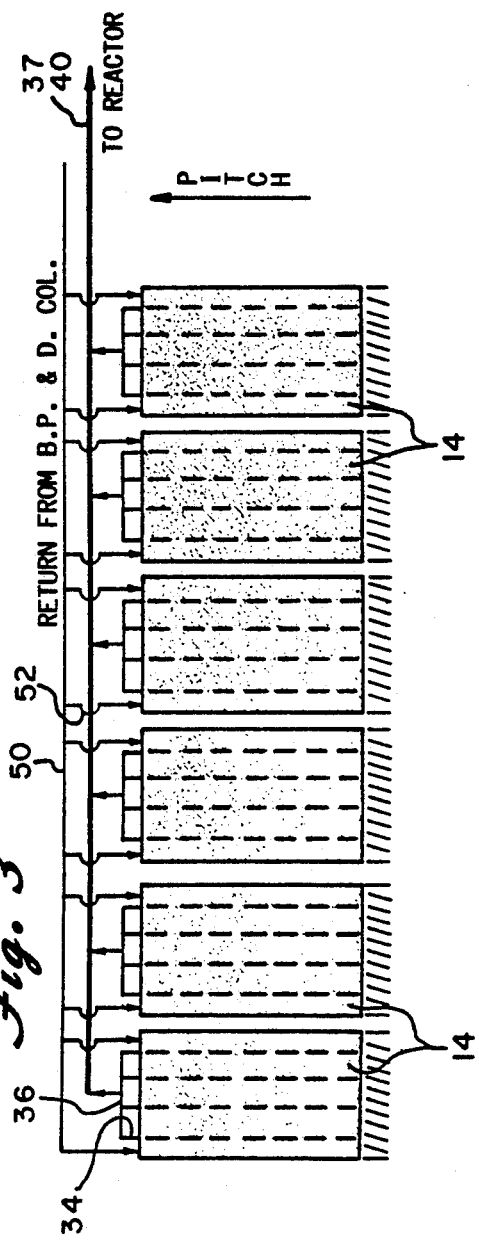
FIG. 3 is a diagram illustrating a group of treatment cells as illustrated in FIG. 1.

In FIG. 3, six treatment bed cells 14 each covering about one-half acre are shown in a diagram of the field cells pitched toward header pipe 36 and sump 41. Fluids are being drawn by vacuum and pump to the bioreactor means along pipes 37 and 40. Vent vapors are distributed along header pipes 50 to perforated pipes 52 which distribute the vapors to the base aggregate layer 30 of treatment beds 14. FIG. 3 is a diagram and the number and spacing of the perforated vacuum and vent tubes are only shown in the schematic fashion. Clearly, across a one-half acre cell, the number of vacuum tubes 36 and the respective number of vent tubes 52 would be increased greatly. As shown by the "pitch" direction liquid entering vacuum lines 34 will flow toward header 36 into sump 41 as shown in FIG. 1.

The system may be described as a closed vent in that there is no direct venting from the bioreactor but with a controlled release into the treatment bed system allowing the vapors to perk upwardly through the treating liquid and emerge as cleansed only carbon dioxide, oxygen and nitrogen. Thus, this system allows biotreatment of any possible vapor contaminants issuing from the bioreactor means.

The type of soil, either mostly clay or mostly sand will cause certain adjustments to be made in the process. Firstly, the soils may be blended together to produce a more standard clay and sand ratio. Secondly, the depth of the soil and the number of vacuum tubes used in a particular cell may be adjusted. Standard hydrogeologist tests may be utilized to adjust the device to treat particular soils and concentrations.

Using a modified systems as described above, soils contaminated with fully halogenated hydrocarbons, such as PCB's can ultimately be treated using the aerobic digestion system described. Prior art describes bioremediation of fully chlorinated hydrocarbons utilizing an anaerobic bacteria that first attacks the chlorine atoms by forming enzymes that attach to these chlorine atoms. Once some of the chlorine atoms have been removed from the molecule, the more standard aerobic digestion techniques can be utilized. In order to handle fully halogenated compounds contaminating the soil, the above device and method must be modified. An additional unit must be included in the bioreactor means to handle the anaerobic bacteria, providing a continuous supply of these specialized bacteria with appropriate nutrients upon demand. The treatment bed is then flooded with liquid and no gases are introduced through the vent lines, other than nitrogen to purge out any oxygen entrained in the soil. The specialized anaerobic bacteria are introduced through the vent piping or vacuum piping under the liquid level and allowed to dissipate in the flooded bed. After an appropriate period of enzymatic reaction wherein some of the chlorine atoms have been removed from a major portion of the molecules of the contaminating chemicals, the system is converted to the aerobic system described hereinabove with the chemicals being treated using aerobic microorganisms to finish the digestion and cleaning of the soil. As the chemicals are partially digested and partially broken down, the materials tend to be self-lubricating to aid in the solubilization of the compounds in the liquid phase to be drawn off by the vacuum line into the bioreactor means.

Although the system illustrated is of large scale to treat substantial quantities of contaminated soil trucked to a particular site and spread on the treatment beds, the system may be utilized for a smaller waste treatment unit placed in a chemical plant which generates relatively small quantities of waste material suitable for bioremediation. In this type of unit, the contaminated soil is replaced by a suitable carrier on which the chemical to be treated is applied. In this type of operation, the carrier is not removed but remains in place with the "contaminating" chemical added either on a continuous or batch basis. The bioreactor operates essentially identically in operation to the one described below scaled in size to meet the lower flow rates.

While this invention has been described with reference to the specific embodiments disclosed herein, it is not confined to the details set forth and the patent is intended to include modifications and changes which may come within and extend from the following claims.

I claim:

1. An apparatus to clean a particulate carrier contaminated with biodegradable chemical compounds comprising:

(a) bed means to contain a carrier contaminated with at least one biodegradable chemical compound having an atmospherically exposed surface on top of a layered bed, said layered bed comprising:
  (i) impervious retaining means at the bottom of the bed to prevent any liquid from escaping from the bed, and
  (ii) a base layer disposed on the impervious retaining means comprising an aggregate,
(b) bioreactor means to hold and propagate a supply of microorganism means comprising microorganisms to break down and digest the biodegradable chemical compound contaminants and to bring these microorganism means into intimate contact with liquid and gaseous biodegradable chemical compound contaminants, the bioreactor means comprising a vapor vent to issue vapors and a liquid outlet means to issue a treating liquid comprising microorganisms,
(c) a multiplicity of parallel aligned first perforated tubing laid in the base layer,
(d) pump means to draw a vacuum on the first perforated tubing and transport fluid from the base layer to the bioreactor means,
(e) a multiplicity of parallel second perforated tubing lengths laid in the base layer, wherein the lengths of second perforated tubing are of sufficient length and of sufficient porosity to reduce the pressure of the vent vapors to zero,
(f) first feed line means fluid flow connecting the second perforated tubing with the vapor vent,
(g) (f) sprinkling means to spread the treating liquid over the exposed surface of the carrier, and
(h) (g) second feed line means fluid flow connecting the liquid outlet means with the sprinkling means.

2. The apparatus of claim 1 wherein the layered bed further comprises:
  (a) membrane means disposed on the base means to prevent fine particle size material from entering the base layer, and
  (b) separation layer means disposed on the membrane means to provide a porous layer, to aid in liquid dispersion between the layers, and to separate the carrier contaminated with biodegradable chemical compounds from the membrane means.

3. The apparatus of claim 1 wherein the bioreactor means comprises:
  (a) mixing means to prepare an aqueous mixture of microorganisms and to feed the mixture to,
  (b) bioreactor column means to propagate the microorganisms and to bring the microorganisms into intimate contact with the fluid from the base layer, and
  (c) distribution means to receive fluid from the bioreactor column means, provide controllable back pressure to the bioreactor column means, and to distribute vapors to the first feed line means and liquid to the second feed line means.

4. The apparatus of claim 1 wherein the first length of perforated tubing is of sufficient porosity that the vacuum drawn on that tubing by the pump means is sufficient to draw air into the tubing as well as the treating liquid.

5. An apparatus to clean a particulate carrier contaminated with biodegradable chemical compounds comprising:
  (a) bed means to expose a carrier contaminated with at least one biodegradable chemical compound with an atmospherically exposed surface on top of a layered bed comprising:
    (i) impervious retaining means at the bottom of the bed to prevent any liquid from escaping from the bed, and
    (ii) a base layer disposed on the impervious retaining means comprising aggregate,
  (b) bioreactor means to hold and propagate a supply of microorganism means comprising microorganisms to break down and digest the biodegradable chemical compound contaminants and to bring these microorganism means into intimate contact with liquid and gaseous biodegradable chemical compound contaminants, the bioreactor means comprising a vapor vent to issue vapors and a liquid outlet means to issue a treating liquid comprising microorganisms,
  (c) a multiplicity of parallel aligned first perforated tubing laid in the base layer,
  (d) pump means to draw a vacuum on the first perforated tubing and transport fluid from the base layer to the bioreactor means,
  (e) first feed line means fluid flow connecting the vapor vent with second perforated tubing laid parallel with the first perforated tubing in the base layer, wherein the lengths of second perforated tubing are of sufficient length and of sufficient porosity to reduce the pressure of the vent vapors to zero,
  (f) second feed line means fluid flow connecting the liquid outlet means with a sprinkling means to spread the treating liquid over the exposed surface of the carrier, and
  (g) third feed line means fluid flow connecting the first perforated tubing to pump means to the bioreactor means.

6. A system to clean soil contaminated with biodegradable chemical compounds comprising:
  (a) a layered bed means to hold soil contaminated with biodegradable chemical compounds disposed with an atmospherically exposed surface on top of a layered bed the layered bed comprising:
    (i) impervious retaining means at the bottom of the bed to prevent any liquid from escaping from the bed,
    (ii) a base layer disposed on the impervious retaining means comprising stone granules,
    (iii) membrane means disposed on the base means to prevent fine particle size material from entering the base layer, and
    (iv) separation layer means disposed on the membrane means to provide a porous layer, to aid in liquid dispersion between the layers, and to separate the soil contaminated with biodegradable chemical compounds from the membrane means,
  (b) bioreactor means to hold and propagate a supply of microorganism means comprising microorganisms to break down and digest the biodegradable chemical compound contaminants and to bring these microorganism means into intimate contact with liquid and gaseous biodegradable chemical compound contaminants, the bioreactor means comprising a vapor vent to issue vapors and a liquid outlet means to issue a treating liquid comprising microorganisms,
  (c) a multiplicity of parallel aligned first perforated tubing laid in the base layer,
  (d) pump means to draw a vacuum on the first perforated tubing and transport fluid from the base layer to the bioreactor means, (e) first feed line means fluid flow connecting the first perforated tubing to pump means to the bioreactor means, (f) second feed line means fluid flow connecting the vapor vent with second perforated tubing laid parallel with the first perforated tubing in the base layer, wherein the second length of perforated tubing is of sufficient length and of sufficient porosity to reduce the pressure of the vent vapors to zero, and (g) third feed line means fluid flow connecting the liquid outlet means with a sprinkling means to spread the treating liquid over the exposed surface of the soil.

7. A method to clean a particulate carrier contaminated with biodegradable chemical compounds comprising:

(a) preparing a bed comprising:
  (i) laying an impervious retaining means at the bottom of the bed to prevent any liquid from escaping from the bed,
  (ii) laying a base layer disposed on the impervious retaining means comprising a coarse aggregate,
  (iii) laying membrane means disposed on the base means to prevent fine particle size material from entering the base layer, and
  (iv) laying separation layer means disposed on the membrane means to provide a porous layer, to aid in liquid dispersion between the layers, and to separate the carrier contaminated with biodegradable chemical compounds from the membrane means, (b) spreading the particulate carrier contaminated with at least one biodegradable chemical compound with an exposed surface on top of the layered bed, (c) holding, propagating, and supplying microorganism means comprising microorganisms in a vessel to break down and digest the biodegradable chemical compound contaminants, (d) bringing these microorganism means into intimate contact with liquid and gaseous biodegradable chemical compound contaminants, (e) issuing a treating liquid comprising microorganisms, (f) sprinkling the treating liquid over the exposed surface of the carrier, (g) drawing a vacuum on a multiplicity of parallel aligned first perforated tubing laid in the base layer, (h) transporting fluid from the base layer to the vessel, (i) venting vapors from the vessel, and (j) flowing the vented vapors out to second perforated tubing laid parallel with the first perforated tubing in the base layer to reduce the pressure of the vent vapors to zero.

8. A method to clean a particulate carrier contaminated with biodegradable chemical compounds, comprising:

(a) providing a bed means containing the carrier contaminated with biodegradable chemical compounds having an atmospherically exposed surface on top of a layered bed, said layered bed comprising:
  (i) impervious retaining means at the bottom of the bed to prevent any liquid from escaping from the bed,
  (ii) a base layer disposed on the impervious retaining means comprising aggregate,
  (iii) membrane means disposed on the base means to prevent fine particle size material from entering the base layer, and
  (iv) separation layer means disposed on the membrane means to provide a porous layer, to aid in liquid dispersion between the layers, and to separate the carrier contaminated with biodegradable chemical compounds from the membrane means, (b) providing bioreactor means, the bioreactor means comprising a vapor vent to issue vapors and a liquid outlet means to issue a treating liquid comprising microorganisms, (c) laying a multiplicity of parallel aligned first perforated tubing laid in the base layer, (d) connecting pump means to draw a vacuum on the first perforated tubing and transport fluid from the base layer to the bioreactor means, (e) connecting first feed line means for fluid flow connecting the first perforated tubing to pump means to the bioreactor means, (f) connecting second feed line means for fluid flow connecting the vapor vent with second perforated tubing laid parallel with the first perforated tubing in the base layer, wherein the second perforated tubing is of sufficient length and of sufficient porosity to reduce the pressure of the vent vapors to zero, and (g) connecting third feed line means for fluid flow connecting the liquid outlet means with a sprinkling means to spread the treating liquid over the exposed surface of the carrier.

(h) holding, propagating and supplying microorganism means in the bioreactor means, which microorganisms break down and digest the biodegradable chemical contaminants, (i) bringing said microorganism means into contact with liquid and gaseous biodegradable chemical compound contaminants, (j) issuing a treating liquid comprising microorganisms, (k) sprinkling the treating liquid over the exposed surface of the carrier, (l) drawing a vacuum on the multiplicity of parallel aligned first perforated tubing, (m) transporting fluid from the base layer to the bioreactor means, (n) venting vapors from the bioreactor means, (o) flowing the vented vapors out to the second perforated tubing.

* * * * *